US012676261B2

(12) United States Patent
Urabe et al.

(10) Patent No.: US 12,676,261 B2
(45) Date of Patent: Jul. 7, 2026

(54) COIL COMPONENT

(71) Applicant: TDK CORPORATION, Tokyo (JP)

(72) Inventors: Junichiro Urabe, Tokyo (JP); Toshinori Matsuura, Tokyo (JP); Kazuya Tobita, Tokyo (JP); Noriaki Hamachi, Tokyo (JP); Yuichi Takubo, Tokyo (JP); Yuto Shiga, Tokyo (JP); Youichi Kazuta, Tokyo (JP)

(73) Assignee: TDK CORPORATION, Tokyo (JP)

( * ) Notice: Subject to any disclaimer, the term of this patent is extended or adjusted under 35 U.S.C. 154(b) by 858 days.

(21) Appl. No.: 17/903,850

(22) Filed: Sep. 6, 2022

(65) Prior Publication Data

US 2023/0073373 A1 Mar. 9, 2023

(30) Foreign Application Priority Data

Sep. 7, 2021 (JP) ................................ 2021-145424

(51) Int. Cl.
*H01F 5/00* (2006.01)
*H01F 27/29* (2006.01)

(52) U.S. Cl.
CPC .................................. *H01F 27/29* (2013.01)

(58) Field of Classification Search
CPC ....................................................... H01F 27/29
USPC ................................................. 336/192, 200
See application file for complete search history.

(56) References Cited

U.S. PATENT DOCUMENTS

2019/0088397 A1* 3/2019 Ohtsubo ................ H01F 27/24

FOREIGN PATENT DOCUMENTS

| | | |
|---|---|---|
| JP | S56-144508 A | 11/1981 |
| JP | 2005-191403 A | 7/2005 |
| JP | 2007-200927 A | 8/2007 |

OTHER PUBLICATIONS

English translation of JP2004031883 (Year: 2004).*
English translation of JP2009295759 (Year: 2009).*

* cited by examiner

*Primary Examiner* — Ronald Hinson
(74) *Attorney, Agent, or Firm* — Oliff PLC

(57) ABSTRACT

A coil component includes: an element body including a main surface; a pair of external electrodes disposed on the main surface; and a coil including a coil part positioned in the element body and a pair of connecting parts exposed from the element body and each connected to a corresponding external electrode of the pair of external electrodes. Each of the pair of external electrodes includes a first surface opposing the main surface and a second surface opposing the first surface. Each of the pair of connecting parts includes a first part coupled to the second surface of the corresponding external electrode and a second part continuous with the first part and an end of the coil part.

4 Claims, 7 Drawing Sheets

COIL COMPONENT

BACKGROUND OF THE INVENTION

1. Field of the Invention

The present invention relates to a coil component.

2. Description of Related Art

Known coil components include a substrate in which a pair of through holes are formed, a coil disposed on the substrate, and an external electrode formed over the main surface of the substrate and the inner wall surface of each of the through holes (see, for example, Japanese Unexamined Patent Publication No. S56-144508). In the coil component described in Japanese Unexamined Patent Publication No. S56-144508, both end portions of the coil are respectively inserted in the corresponding through holes and joined to the external electrodes formed on the inner wall surfaces of the through holes.

SUMMARY OF THE INVENTION

In the coil component described in Japanese Unexamined Patent Publication No. S56-144508, the end portions of the coil are positioned in the through holes. In a case where, for example, a physical external force acts on this coil component, the end portion of the coil is likely to come out of the through hole, and the end portion of the coil and the external electrode may be electrically disconnected. The characteristics of the coil component deteriorate in the event of electrical disconnection between the end portion of the coil and the external electrode. The characteristics of coil component include, for example, electrical or magnetic characteristics.

An object of one aspect of the present invention is to provide a coil component in which deterioration of characteristics is suppressed even in a case where a physical external force acts on the coil component.

A coil component according to one aspect includes: an element body including a main surface; a pair of external electrodes disposed on the main surface; and a coil including a coil part positioned in the element body and a pair of connecting parts exposed from the element body and each connected to a corresponding external electrode of the pair of external electrodes. Each of the pair of external electrodes includes a first surface opposing the main surface and a second surface opposing the first surface. Each of the pair of connecting parts includes a first part coupled to the second surface of the corresponding external electrode and a second part continuous with the first part and an end of the coil part.

In the above aspect, the pair of external electrodes include the first surfaces opposing the main surface of the element body and the second surfaces opposing the first surfaces, respectively. The pair of connecting parts include the first parts coupled to the second surfaces of the corresponding external electrodes, respectively. The external electrodes are positioned between the element body and the first parts of the connecting parts, and the external electrodes are connected to the first parts of the connecting parts. Accordingly, even in a case where a physical external force acts on the coil component, the external electrodes tend not to come off the connecting parts, and the electrical connection between the coil and the external electrodes is maintained. As a result, deterioration of the characteristics of the coil component is suppressed.

In the above aspect, a through hole opening in the first surface and the second surface may be formed in each of the pair of external electrodes. Each of the second parts may be at least partially positioned in the corresponding through hole.

In the configuration in which the through holes opening in the first surfaces and the second surfaces are respectively formed in the pair of external electrodes and the second parts are respectively at least partially positioned in the corresponding through holes, the first parts of the connecting parts function as anchors suppressing the connecting parts coining out of the through holes. Accordingly, even in a case where a physical external force acts on the coil component, the external electrodes tend not to come off the connecting parts, and the electrical connection between the coil and the external electrodes is maintained more reliably. As a result, deterioration of the characteristics of the coil component is further suppressed.

In the above aspect, the coil component may further include a plating layer formed on the second surface to cover the first part.

In the configuration in which the coil component includes the plating layers formed on the second surfaces to cover the first parts, the first parts of the connecting parts are covered with the plating layers. Thus, the first parts tend not to peel off the second surfaces. Accordingly, even in a case where a physical external force acts on the coil component, the external electrodes tend not to come off the connecting parts, and the electrical connection between the coil and the external electrodes is maintained more reliably. As a result, deterioration of the characteristics of the coil component is further suppressed.

In the above aspect, the element body may include a first element body part covering the coil part and a second element body part including the main surface. The second element body part may be positioned between the coil part and the pair of external electrodes.

In the configuration in which the element body includes the first element body part and the second element body part and the second element body part is positioned between the coil part and the pair of external electrodes, the element body includes at least two parts. Accordingly, in this configuration, the degree of freedom in selecting the material of the element body is improved and the range of adjustment of the characteristics of the coil component is widened.

In the above aspect, a relative permittivity of the second element body part may be lower than a relative permittivity of the first element body part.

In the configuration in which the relative permittivity of the second element body part is lower than the relative permittivity of the first element body part, the stray capacitance generated between the coil part and the external electrodes is reduced by the second element body part. As a result, a decline in self-resonant frequency in the coil component is suppressed.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
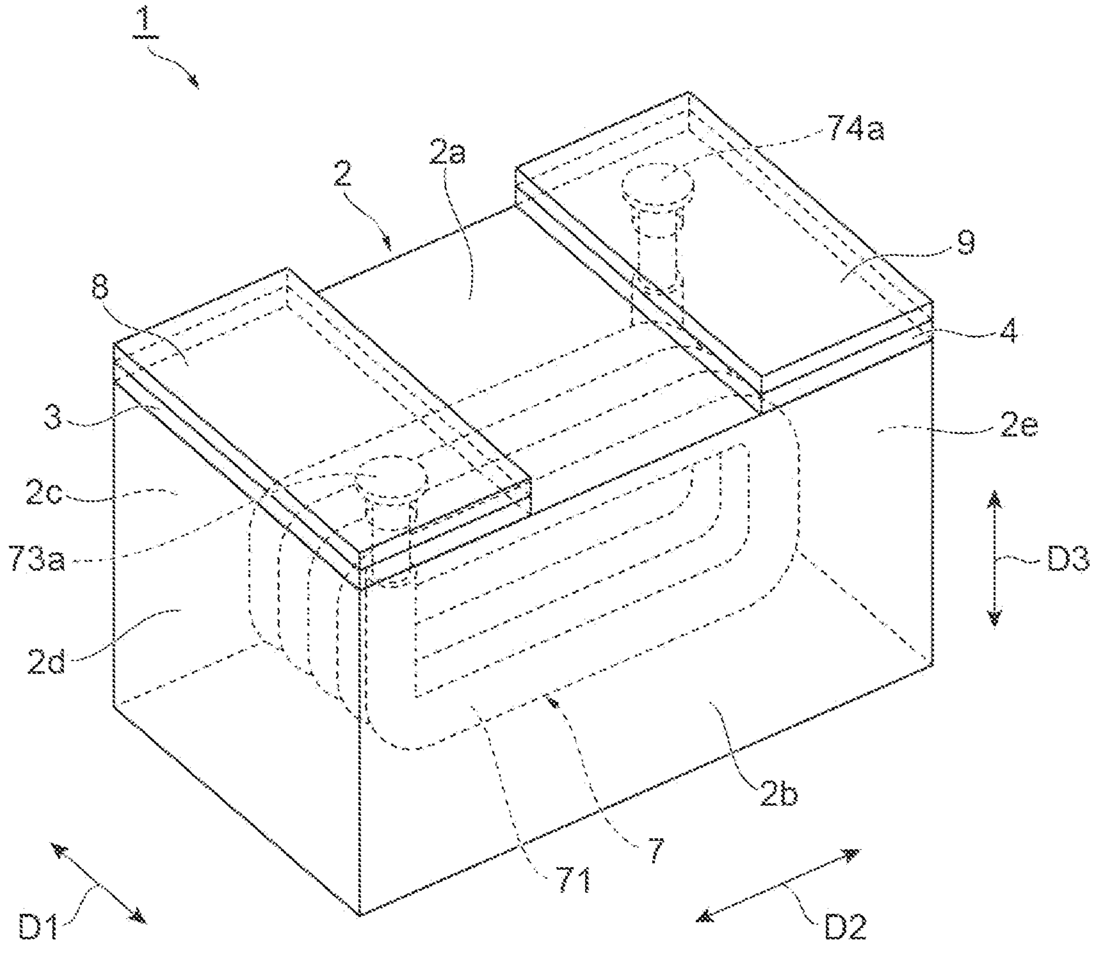
FIG. 1 is a perspective view illustrating a coil component according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
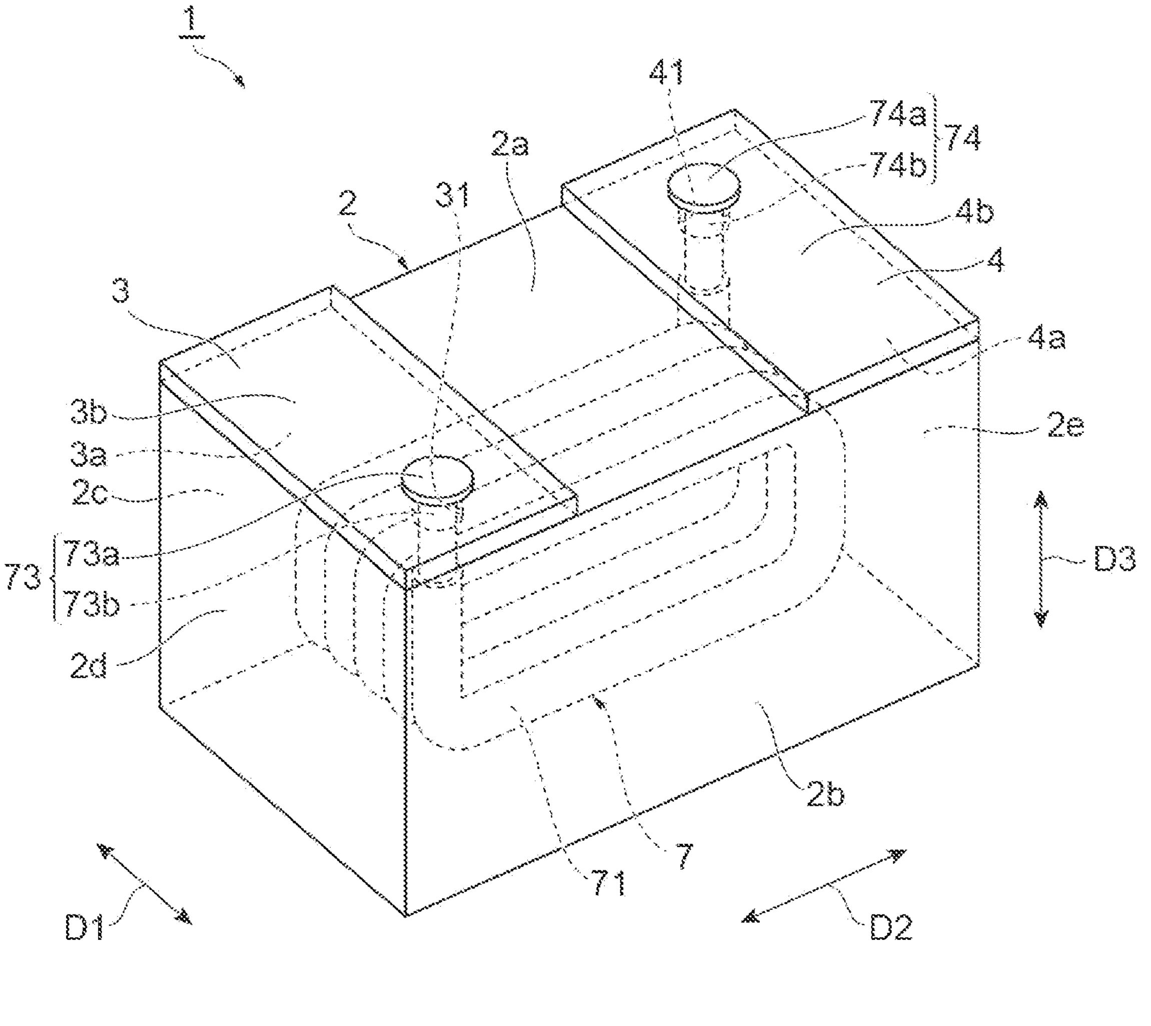
FIG. 2 is a diagram illustrating the configuration of external electrodes.
Figure 3:
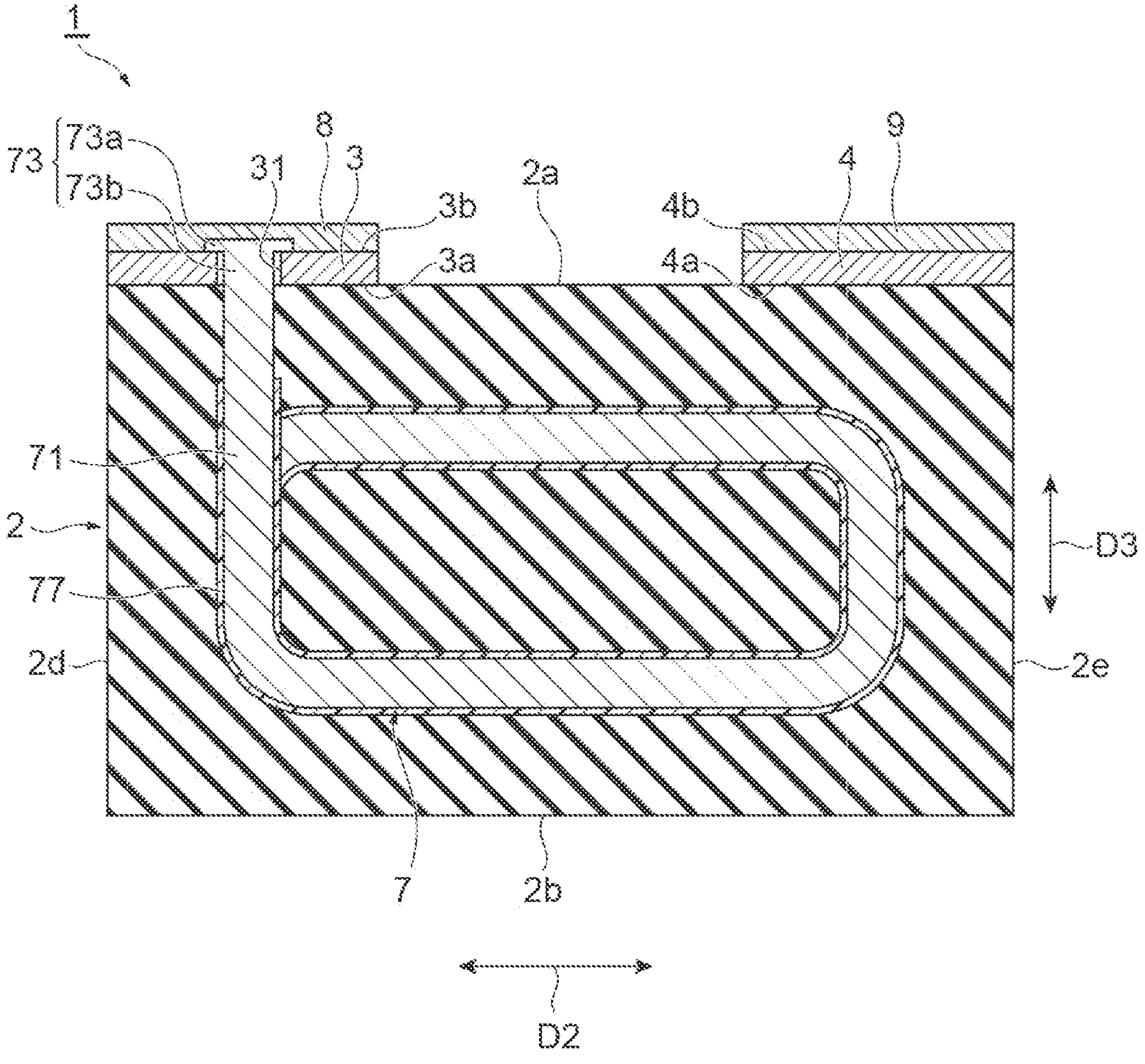
FIG. 3 is a diagram illustrating a cross-sectional configuration of the coil component according to the first embodiment.

The configuration of a coil component 1 according to a first embodiment will be described with reference to FIGS. 1 to 3. FIG. 1 is a perspective view illustrating the coil component 1 according to the present embodiment. FIG. 2 is a diagram illustrating the configuration of external electrodes 3 and 4. FIG. 2 is a perspective view of the coil component 1 illustrated in FIG. 1 in which plating layers 8 and 9 are not illustrated. FIG. 3 is a diagram illustrating a cross-sectional configuration of the coil component 1. The coil component 1 includes an element body 2, the pair of external electrodes 3 and 4, a coil 7, and the plating layers 8 and 9.

The element body 2 has a rectangular parallelepiped shape. The rectangular parallelepiped shape includes the shape of a rectangular parallelepiped with chamfered corner and ridge portions and the shape of a rectangular parallelepiped with rounded corner and ridge portions. The element body 2 includes a main surface 2*a*, a pair of side surfaces 2*b* and 2*c*, and a pair of end surfaces 2*d* and 2*e*. The pair of side surfaces 2*b* and 2*c* oppose each other. The direction in which the pair of side surfaces 2*b* and 2*c* oppose each other is a first direction D1. The pair of end surfaces 2*d* and 2*e* oppose each other. The direction in which the pair of end surfaces 2*d* and 2*e* oppose each other is a second direction D2. The direction perpendicular to the main surface 2*a* is a third direction D3. In the present embodiment, the first direction D1 is the lateral direction of the element body 2. The second direction D2 is the longitudinal direction of the element body 2 and is orthogonal to the first direction D1. The third direction D3 is the height direction of the element body 2 and is orthogonal to the first direction D1 and the second direction D2.

The main surface 2*a* is along the first direction D1 and the second direction D2. Each of the side surfaces 2*b* and 2*c* is along the second direction D2 and the third direction D3. Each of the end surfaces 2*d* and 2*e* is along the first direction D1 and the third direction D3. The main surface 2*a* interconnects the pair of side surfaces 2*b* and 2*c*. The main surface 2*a* interconnects the pair of end surfaces 2*d* and 2*e*. The coil component 1 is, for example, solder-mounted on an electronic device. The electronic device is, for example, a circuit board or an electronic component. In the coil component 1, the main surface 2*a* is a mounting surface opposing the electronic device.

The element body 2 includes, for example, an electrically insulating material. The element body 2 includes, for example, a resin. The resin is, for example, a liquid crystal polymer (LCP), a polyimide resin, crystalline polystyrene, an epoxy resin, or a fluororesin. The polyimide resin is, for example, a bismaleimide resin. The fluororesin is, for example, a polytetrafluoroethylene resin (PTFE). The material of the element body 2 may contain a filler for enhancing the characteristics of the coil component 1 or an impurity.

The pair of external electrodes 3 and 4 are disposed on the main surface 2*a*. The pair of external electrodes 3 and 4 are electrically connected to the coil 7. As illustrated in FIG. 2, the pair of external electrodes 3 and 4 are disposed on both end portions of the element body 2 in the second direction D2, respectively. The pair of external electrodes 3 and 4 are separated from each other in the second direction D2. The external electrode 3 is disposed closer to the end surface 2*d* than the external electrode 4. The external electrode 4 is disposed closer to the end surface 2*e* than the external electrode 3.

Each of the external electrodes 3 and 4 has a flat plate shape. Each of the external electrodes 3 and 4 has a thickness in the third direction D3. In the present embodiment, each of the external electrodes 3 and 4 has a rectangular shape in a plan view. Each of the external electrodes 3 and 4 may have a rectangular shape with a rounded corner portion in a plan view or may have an elliptical shape or an oval shape. The longitudinal direction of each of the external electrodes 3 and 4 is along the first direction D1, that is, the lateral direction of the element body 2. In the present embodiment, the length of each of the external electrodes 3 and 4 in the first direction D1 is equivalent to the length of the element body 2 in the first direction D1. Hereinafter, "equivalent" does not necessarily mean an equal value. A value may be equivalent even in a case where the value includes a slight difference, a manufacturing error, or a measurement error in a preset range.

As illustrated in FIG. 3, the external electrode 3 includes a first surface 3*a* and a second surface 3*b*. The first surface 3*a* is a flat surface along the first direction D1 and the second direction D2. The first surface 3*a* opposes the main surface 2*a*. The first surface 3*a* may directly oppose the main surface 2*a* or may indirectly oppose the main surface 2*a*. The first surface 3*a* directly opposing the main surface 2*a* means that there is no intervening element between the first surface 3*a* and the main surface 2*a*. The first surface 3*a* indirectly opposing the main surface 2*a* means that there is an intervening element between the first surface 3*a* and the main surface 2*a*. An adhesive may be disposed as an intervening element between the first surface 3*a* and the main surface 2*a*.

The second surface 3*b* is a flat surface along the first direction D1 and the second direction D2. In the present embodiment, the second surface 3*b* is parallel to the first surface 3*a*. The second surface 3*b* opposes the first surface 3*a*. As illustrated in FIG. 3, a through hole 31 opening in the first surface 3*a* and the second surface 3*b* is formed in the external electrode 3. The outer edge of the through hole 31 that is viewed from the third direction D3 has a circular shape.

The external electrode 4 includes a first surface 4*a* and a second surface 4*b*. The first surface 4*a* is a flat surface along the first direction D1 and the second direction D2. The first surface 4*a* opposes the main surface 2*a*. The first surface 4*a* may directly oppose the main surface 2*a* or may indirectly oppose the main surface 2*a*. The first surface 4*a* directly opposing the main surface 2*a* means that there is no intervening element between the first surface 4*a* and the main surface 2*a*. The first surface 4*a* indirectly opposing the main surface 2*a* means that there is an intervening element between the first surface 4*a* and the main surface 2*a*. An adhesive may be disposed as an intervening element between the first surface 4*a* and the main surface 2*a*.

The second surface 4*b* is a flat surface along the first direction D1 and the second direction D2. In the present embodiment, the second surface 4*b* is parallel to the first surface 4*a*. The second surface 4*b* opposes the first surface 4*a*. A through hole 41 opening in the first surface 4*a* and the second surface 4*b* is formed in the external electrode 4. The outer edge of the through hole 41 that is viewed from the third direction D3 has a circular shape.

Each of the external electrodes 3 and 4 includes, for example, a metal material. The metal material is, for example, copper, silver, gold, nickel, or chromium. Each of the external electrodes 3 and 4 may be formed with an electroplating method or a laser direct structuring (LDS) method. Each of the external electrodes 3 and 4 may be formed through an electrode paste being applied to the element body 2 and then dried. The electrode paste is formed on the element body 2 with, for example, a screen printing method. Each of the external electrodes 3 and 4 may be made of a flat plate-shaped metal material. The flat plate-shaped metal material may be formed with pressing.

The coil 7 includes a coil part 71 and a pair of connecting parts 73 and 74. The coil part 71 is positioned in the element body 2. The coil part 71 has a spiral shape. The axis of the coil part 71 is along the first direction D1. The coil part 71 includes a plurality of turns lined up in the first direction D1.

The pair of connecting parts 73 and 74 are exposed from the element body 2. Each of the pair of connecting parts 73 and 74 is continuous with one of both ends of the coil part 71 that corresponds. As illustrated in FIG. 2, the pair of connecting parts 73 and 74 are positioned on a diagonal line of the main surface 2*a* when viewed from the third direction D3. In the present embodiment, the pair of connecting parts 73 and 74 are positioned on the diagonal line connecting the ridge portion of the side surface 2*b* and the end surface 2*d* and the ridge portion of the side surface 2*c* and the end surface 2*e*. The connecting part 73 is positioned closer to the ridge portion of the side surface 2*b* and the end surface 2*d* than the connecting part 74. Each of the pair of connecting parts 73 and 74 is connected to one of the pair of external electrodes 3 and 4 that corresponds. The connecting part 73 is electrically and physically connected to the external electrode 3. The connecting part 74 is electrically and physically connected to the external electrode 4.

The coil part 71 and the pair of connecting parts 73 and 74 are configured from a wire. The wire includes, for example, a metal material. The metal material is, for example, copper, silver, gold, nickel, or chromium. The diameter of the wire is, for example, 20 μm or more and 40 μm or less. As illustrated in FIG. 3, a coating 77 is formed around the wire that configures the coil part 71. The coating 77 includes, for example, an electrically insulating material. The electrically insulating material is, for example, polyurethane. The coating 77 is not formed around the wire that configures the connecting parts 73 and 74.

The connecting part 73 includes a first part 73*a* and a second part 73*b*. The first part 73*a* is exposed from the external electrode 3 as illustrated in FIG. 3. As illustrated in FIG. 2, the first part 73*a* has a circular shape when viewed from the third direction D3. The diameter of the first part 73*a* that is viewed from the third direction D3 is larger than the inner diameter of the through hole 31. The shape of the first part 73*a* is not limited, and the first part 73*a* that is viewed from the third direction D3 may have a rectangular shape or an elliptical shape. The first part 73*a* is coupled to the second surface 3*b*. The first part 73*a* may be joined to the second surface 3*b* without an intervening element. The first part 73*a* may be fused to the second surface 3*b* without an intervening element. For example, the first part 73*a* may be fused to the second surface 3*b* with thermocompression bonding or ultrasonic joining. The first part 73*a* may be bonded to the second surface 3*b* by an intervening element. The intervening element may be, for example, an adhesive.

The second part 73*b* connects the first part 73*a* and one of both ends of the coil part 71 that corresponds. The second part 73*b* extends in the third direction D3. One end of the second part 73*b* is continuous with the first part 73*a*. The other end of the second part 73*b* is continuous with the end of the coil part 71. The second part 73*b* is inserted through the through hole 31. The second part 73*b* is at least partially positioned in the through hole 31. The second part 73*b* has a circular cross-sectional shape. The diameter of the second part 73*b* is smaller than the inner diameter of the through hole 31. A gap is formed between the side surface of the second part 73*b* and the inner surface of the through hole 31. The diameter of the cross section of the second part 73*b* may be equivalent to the inner diameter of the through hole 31. The side surface of the second part 73*b* may be in contact with the inner surface of the through hole 31.

The connecting part 74 includes a first part 74*a* and a second part 74*b*. The first part 74*a* is exposed from the external electrode 4. As illustrated in FIG. 2, the first part 74*a* has a circular shape when viewed from the third direction D3. The diameter of the first part 74*a* that is viewed from the third direction D3 is larger than the inner diameter of the through hole 41. The shape of the first part 74*a* is not limited, and the first part 74*a* that is viewed from the third direction D3 may have a rectangular shape or an elliptical shape. The first part 74*a* is coupled to the second surface 4*b*. The first part 74*a* may be joined to the second surface 4*b* without an intervening element. The first part 74*a* may be fused to the second surface 4*b* without an intervening element. For example, the first part 74*a* may be fused to the second surface 4*b* with thermocompression bonding or ultrasonic joining. The first part 74*a* may be bonded to the second surface 4*b* by an intervening element. The intervening element may be, for example, an adhesive.

The second part 74*b* connects the first part 74*a* and one of both ends of the coil part 71 that corresponds. The second part 74*b* extends in the third direction D3. One end of the second part 74*b* is continuous with the first part 74*a*. The other end of the second part 74*b* is continuous with the end of the coil part 71. The second part 74*b* is inserted through the through hole 41. The second part 74*b* is at least partially positioned in the through hole 41. The second part 74*b* has a circular cross-sectional shape. The diameter of the second part 74*b* is smaller than the inner diameter of the through hole 41. A gap is formed between the side surface of the second part 74*b* and the inner surface of the through hole 41. The diameter of the cross section of the second part 74*b* may be equivalent to the inner diameter of the through hole 41.

The side surface of the second part 74*b* may be in contact with the inner surface of the through hole 41.

The plating layer 8 is formed on the second surface 3*b*. The plating layer 8 covers the first part 73*a*. A part of the first part 73*a* is positioned between the plating layer 8 and the second surface 3*b*. In the present embodiment, the plating layer 8 is formed over the entire area of the second surface 3*b*. The plating layer 9 is formed on the second surface 4*b*. The plating layer 9 covers the first part 74*a*. A part of the first part 74*a* is positioned between the plating layer 9 and the first surface 4*a*. In the present embodiment, the plating layer 9 is formed over the entire area of the second surface 4*b*. Each of the plating layers 8 and 9 includes, for example, a metal material. The metal material is, for example, copper, silver, gold, nickel, or chromium. Each of the plating layers 8 and 9 may be formed with an electroplating method or an LDS method.

Figure 4:
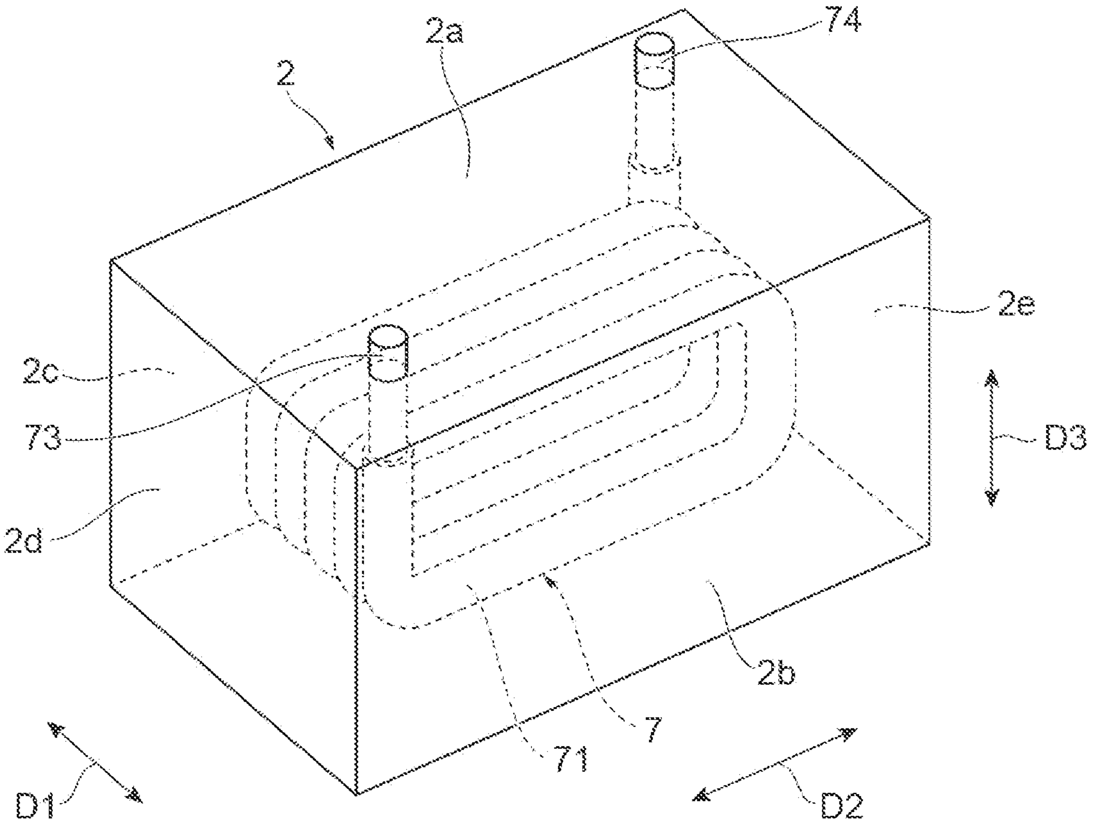
FIG. 4 is a diagram illustrating the element body and the coil before the external electrodes are disposed.
Figure 5:
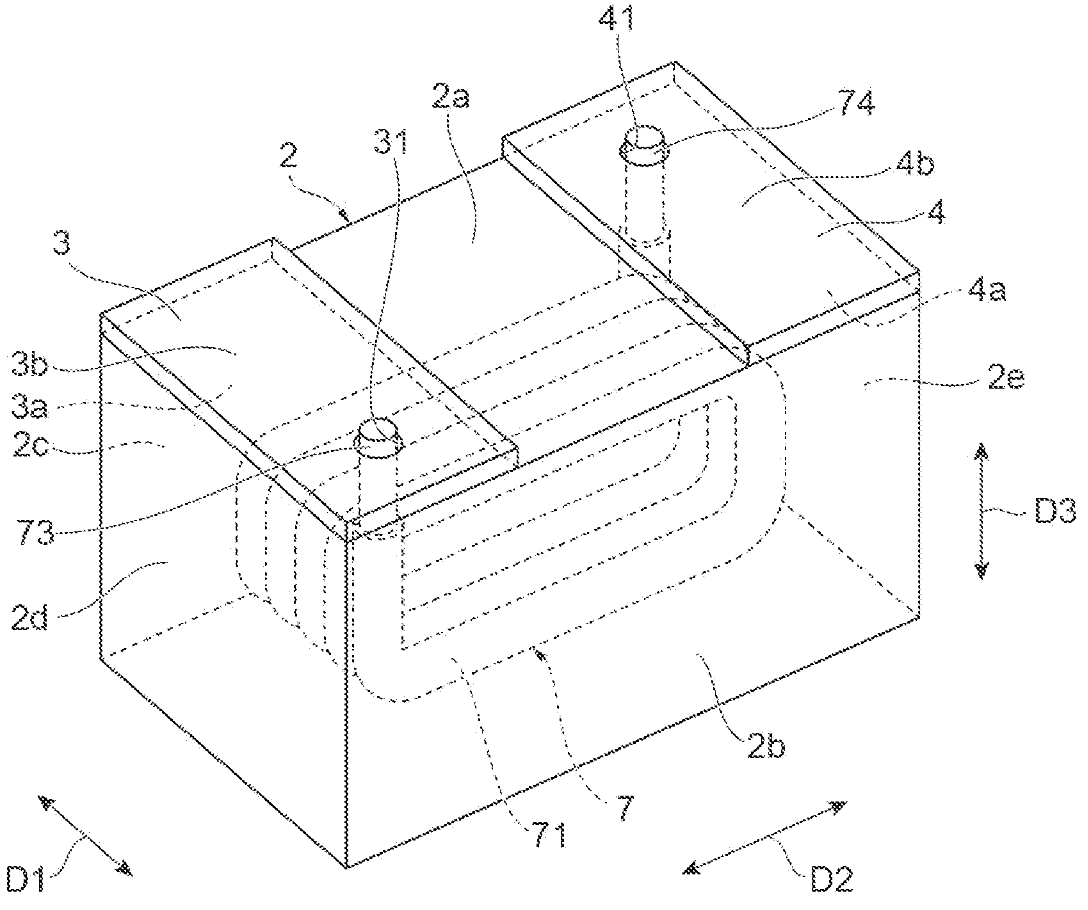
FIG. 5 is a diagram illustrating the element body and the coil in a state where the external electrodes are disposed.

The state of the coil 7 in the process of making the coil component 1 will be described with reference to FIGS. 4 and 5. FIG. 4 is a diagram illustrating the element body 2 and the coil 7 before the external electrodes 3 and 4 are disposed. FIG. 5 is a diagram illustrating the element body 2 and the coil 7 in a state where the external electrodes 3 and 4 are disposed. FIGS. 4 and 5 both illustrate a state where the connecting parts 73 and 74 are yet to be coupled to the external electrodes 3 and 4. The process of making the coil component 1 includes the step illustrated in FIG. 4 and the step illustrated in FIG. 5.

As illustrated in FIG. 4, the connecting part 73 does not include the first part 73*a* and the second part 73*b* in a state where the connecting part 73 is not coupled to the external electrode 3. In the state illustrated in FIG. 4, the connecting part 73 has a cylindrical shape. The central axis of the connecting part 73 is along the third direction D3. The connecting part 74 does not include the first part 74*a* and the second part 74*b* in a state where the connecting part 74 is not coupled to the external electrode 4. In the state illustrated in FIG. 4, the connecting part 74 has a cylindrical shape. The central axis of the connecting part 74 is along the third direction D3. Each of the diameters of the connecting parts 73 and 74 is constant in the third direction D3.

In the state illustrated in FIG. 5, each of the external electrodes 3 and 4 is disposed on the main surface 2*a*. The connecting part 73 is inserted through the through hole 31. The connecting part 74 is inserted through the through hole 41. The lengths of the connecting parts 73 and 74 in the third direction D3 are larger than the thicknesses of the external electrodes 3 and 4, respectively. The connecting part 73 includes an end portion exposed to the outside of the external electrode 3 from the through hole 31. The connecting part 74 includes an end portion exposed to the outside of the external electrode 4 from the through hole 41. In the present embodiment, the end portion of the connecting part 73 that is exposed from the through hole 31 is fused to the second surface 3*b*. The state after the fusion is illustrated in FIG. 2. The end portion of the connecting part 73 in FIG. 5 that is exposed from the through hole 31 is the first part 73*a* illustrated in FIG. 2. The part of the connecting part 73 in FIG. 5 that is positioned in the through hole 31 is the second part 73*b* illustrated in FIG. 2. The end portion of the connecting part 74 that is exposed from the through hole 41 is the first part 74*a* illustrated in FIG. 2. The part of the connecting part 74 in FIG. 5 that is positioned in the through hole 41 is the second part 74*b* illustrated in FIG. 2.

In the coil component 1, the pair of external electrodes 3 and 4 include the first surfaces 3*a* and 4*a* opposing the main surface 2*a* of the element body 2 and the second surfaces 3*b* and 4*b* opposing the first surfaces 3*a* and 4*a*, respectively. The pair of connecting parts 73 and 74 include the first parts 73*a* and 74*a* coupled to the second surfaces 3*b* and 4*b* of the corresponding external electrodes 3 and 4, respectively. The external electrodes 3 and 4 are positioned between the element body 2 and the first parts 73*a* and 74*a* of the connecting parts 73 and 74, and the external electrodes 3 and 4 are connected to the first parts 73*a* and 74*a* of the connecting parts 73 and 74. Accordingly, even in a case where a physical external force acts on the coil component 1, the external electrodes 3 and 4 tend not to come off the connecting parts 73 and 74, and the electrical connection between the coil 7 and the external electrodes 3 and 4 is maintained. As a result, deterioration of the characteristics of the coil component 1 is suppressed.

The through holes 31 and 41 opening in the first surfaces 3*a* and 4*a* and the second surfaces 3*b* and 4*b* are formed in the pair of external electrodes 3 and 4, respectively. The second parts 73*b* and 74*b* are at least partially positioned in the corresponding through holes 31 and 41, respectively.

In the configuration, the first parts 73*a* and 74*a* of the connecting parts 73 and 74 function as anchors suppressing the connecting parts 73 and 74 coming out of the through holes 31 and 41. Accordingly, even in a case where a physical external force acts on the coil component 1, the external electrodes 3 and 4 tend not to come off the connecting parts 73 and 74, and the electrical connection between the coil 7 and the external electrodes 3 and 4 is maintained more reliably. As a result, deterioration of the characteristics of the coil component 1 is further suppressed.

The coil component 1 includes the plating layers 8 and 9 formed on the second surfaces 3*b* and 4*b* to cover the first parts 73*a* and 74*a*.

In the configuration, the first parts 73*a* and 74*a* are covered with the plating layers 8 and 9. Thus, the first parts 73*a* and 74*a* tend not to peel off the second surfaces 3*b* and 4*b*. Accordingly, even in a case where a physical external force acts on the coil component 1, the external electrodes 3 and 4 tend not to come off the connecting parts 73 and 74, and the electrical connection between the coil 7 and the external electrodes 3 and 4 is maintained more reliably. As a result, deterioration of the characteristics of the coil component 1 is further suppressed.

Modification Example

Figure 6:
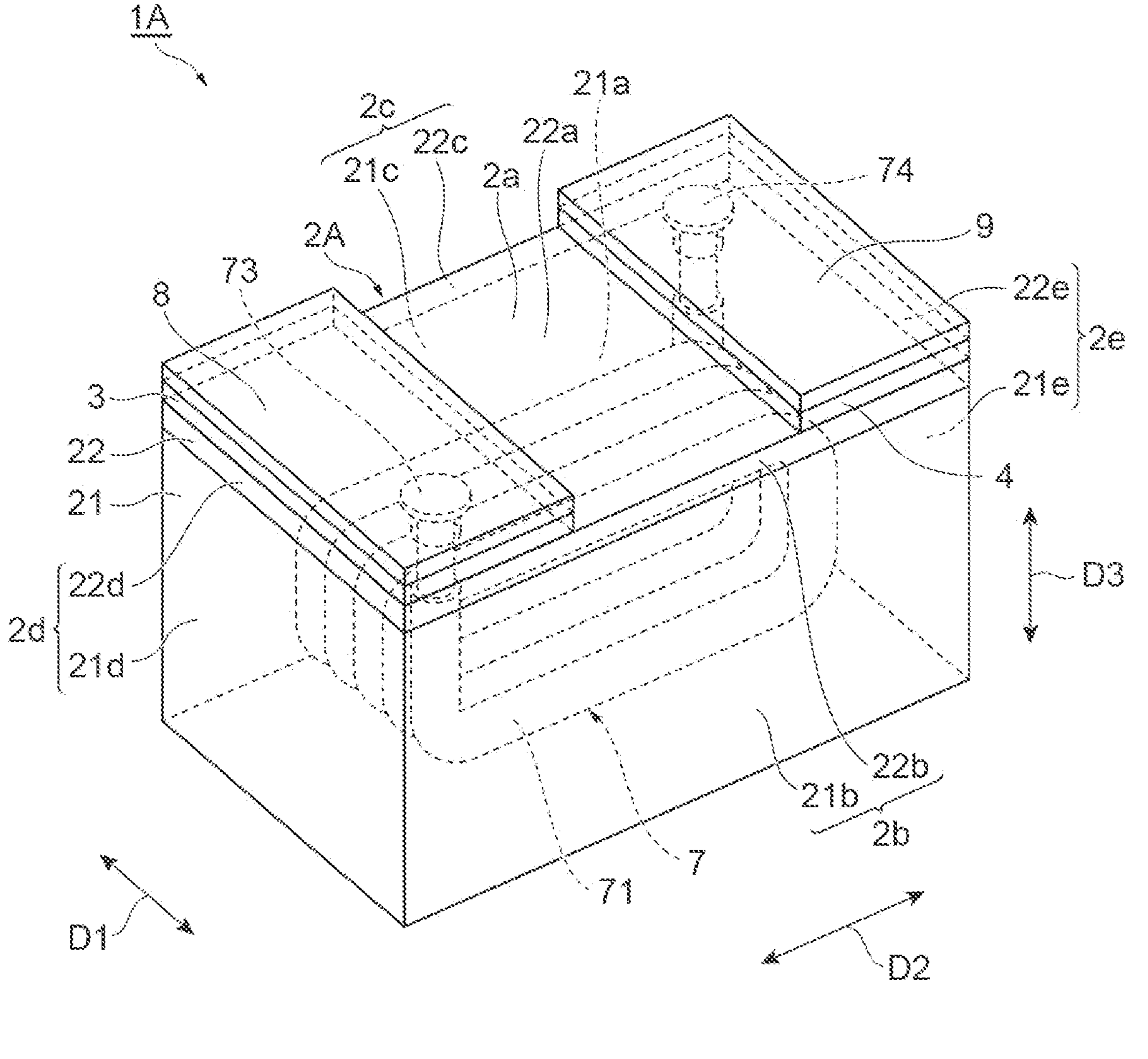
FIG. 6 is a perspective view illustrating a coil component according to a modification example.

The configuration of a modification example of the coil component 1 will be described with reference to FIG. 6. FIG. 6 is a perspective view illustrating a coil component 1A according to the modification example. This modification example differs in element body configuration from the first embodiment described above. Hereinafter, the difference between the above first embodiment and this modification example will be mainly described with description of the common points omitted in some cases.

An element body 2A according to the modification example includes a first element body part 21 and a second element body part 22. The first element body part 21 covers the coil part 71. The first element body part 21 has a rectangular parallelepiped shape. The first element body part 21 includes a main surface 21*a*, a pair of side surfaces 21*b* and 21*c*, and a pair of end surfaces 21*d* and 21*e*. The pair of side surfaces 21*b* and 21*c* oppose each other in the first direction D1. The pair of end surfaces 21*d* and 21*e* oppose each other in the second direction D2.

The main surface 21*a* is along the first direction D1 and the second direction D2. Each of the side surfaces 21*b* and 21*c* is along the second direction D2 and the third direction D3. Each of the end surfaces 21*d* and 21*e* is along the first direction D1 and the third direction D3. The main surface 21*a* interconnects the pair of side surfaces 21*b* and 21*c*. The main surface 21*a* interconnects the pair of end surfaces 21*d* and 21*e*. The main surface 21*a* is in direct contact with the second element body part 22.

The second element body part 22 has a rectangular parallelepiped shape. The second element body part 22 is positioned between the coil part 71 and the pair of external electrodes 3 and 4. The second element body part 22 may be a substrate of the coil component 1A. The second element body part 22 includes a main surface 22*a*, a pair of side surfaces 22*b* and 22*c*, and a pair of end surfaces 22*d* and 22*e*. The pair of side surfaces 22*b* and 22*c* oppose each other in the first direction D1. The pair of end surfaces 22*d* and 22*e* oppose each other in the second direction D2.

The main surface 22*a* is along the first direction D1 and the second direction D2. Each of the side surfaces 22*b* and 22*c* is along the second direction D2 and the third direction D3. Each of the end surfaces 22*d* and 22*e* is along the first direction D1 and the third direction D3. The main surface 22*a* interconnects the pair of side surfaces 22*b* and 22*c*. The main surface 22*a* interconnects the pair of end surfaces 22*d* and 22*e*. The main surface 22*a* is the main surface 2*a*. The main surface 2*a* is the mounting surface of the coil component 1A. The second element body part 22 includes the main surface 2*a*.

The side surface 21*b* is flush with the side surface 22*b* and configures the side surface 2*b* together with the side surface 22*b*. The side surface 21*c* is flush with the side surface 22*c* and configures the side surface 2*c* together with the side surface 22*c*. The end surface 21*d* is flush with the end surface 22*d* and configures the end surface 2*d* together with the end surface 22*d*. The end surface 21*e* is flush with the end surface 22*e* and configures the end surface 2*e* together with the end surface 22*e*.

Each of the first element body part 21 and the second element body part 22 includes, for example, an electrically insulating material. Each of the first element body part 21 and the second element body part 22 includes, for example, a resin. The resin is, for example, a liquid crystal polymer (LCP), a polyimide resin, crystalline polystyrene, an epoxy resin, or a fluororesin. The polyimide resin is, for example, a bismaleimide resin. The fluororesin is, for example, a polytetrafluoroethylene resin (PTFE). The material of the first element body part 21 and the second element body part 22 may contain a filler for enhancing the characteristics of the coil component 1A or an impurity. The second element body part 22 may include a material lower in relative permittivity than the first element body part 21. The relative permittivity of the second element body part 22 may be lower than the relative permittivity of the first element body part 21. The relative permittivity of the material included in the first element body part 21 is, for example, 2 or more and 4 or less. The relative permittivity of the material included in the second element body part 22 is, for example, 2 or more and 3 or less.

In this modification example, the element body 2A includes the first element body part 21 covering the coil part 71 and the second element body part 22 including the main surface 2*a*. The second element body part 22 is positioned between the coil part 71 and the pair of external electrodes 3 and 4.

In the configuration, the element body 2A includes at least two parts. Thus, the degree of freedom in selecting the material of the element body 2A is improved and the range of adjustment of the characteristics of the coil component 1A is widened.

In this modification example, the relative permittivity of the second element body part 22 may be lower than the relative permittivity of the first element body part 21.

In the configuration in which the relative permittivity of the second element body part 22 is lower than the relative permittivity of the first element body part 21, the stray capacitance generated between the coil part 71 and the external electrodes 3 and 4 is reduced by the second element body part 22. As a result, a decline in self-resonant frequency in the coil component 1A is suppressed.

Second Embodiment

Figure 7:
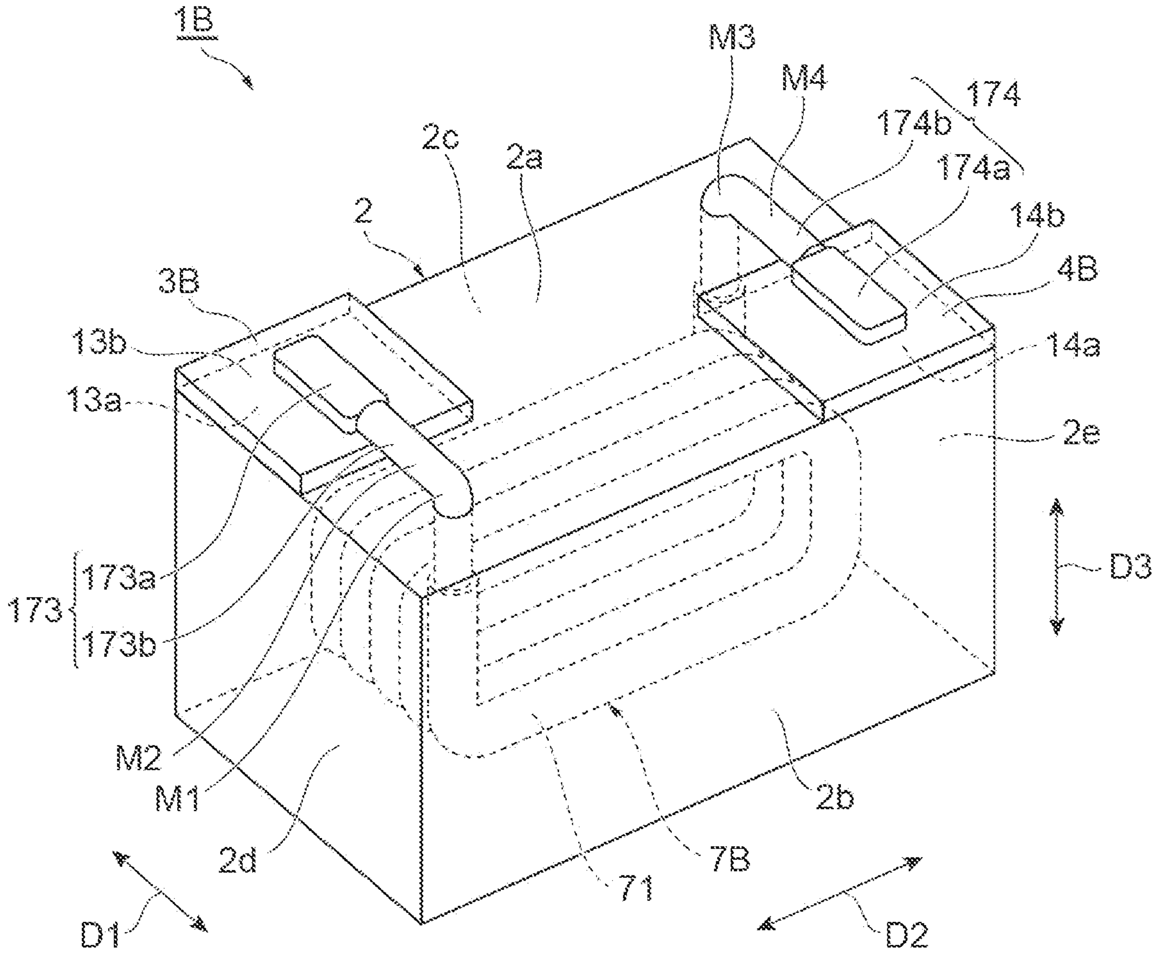
FIG. 7 is a perspective view illustrating a coil component according to a second embodiment.

A coil component 1B according to a second embodiment will be described with reference to FIG. 7. FIG. 7 is a perspective view illustrating the coil component 1B according to the second embodiment. The second embodiment differs from the first embodiment described above in terms of the configurations of external electrodes 3B and 4B and connecting parts 173 and 174. Hereinafter, the difference between the above first embodiment and the second embodiment will be mainly described with description of the common points omitted in some cases. The coil component 1B according to the second embodiment includes the element body 2, the pair of external electrodes 3B and 4B, and a coil 7B. The configuration of the element body 2 is similar to the configuration described in the first embodiment.

In the coil component 1, the length of each of the external electrodes 3 and 4 in the first direction D1 is equivalent to the length of the element body 2 in the first direction D1 as illustrated in FIG. 2. In the coil component 1B, the length of each of the external electrodes 3B and 4B in the first direction D1 is smaller than the length of the element body 2 in the first direction D1. The length of each of the external electrodes 3B and 4B in the first direction D1 is approximately half the length of the element body 2 in the first direction D1. Each of the external electrodes 3B and 4B has a square shape in a plan view. Each of the external electrodes 3B and 4B may have a square shape with a rounded corner portion in a plan view or may have an elliptical shape or a circular shape.

The external electrode 3B includes a first surface 13*a* and a second surface 13*b*. The first surface 13*a* opposes the main surface 2*a*. The first surface 13*a* may directly oppose the main surface 2*a* or may indirectly oppose the main surface 2*a*. The second surface 13*b* opposes the first surface 13*a*. The external electrode 3B is positioned between the element body 2 and a first part 173*a* of the connecting part 173. In the coil component 1, the through hole 31 is formed in the external electrode 3 as illustrated in FIG. 2. In the coil component 1B, no through hole is formed in the external electrode 3B.

The external electrode 4B includes a first surface 14*a* and a second surface 14*b*. The first surface 14*a* opposes the main surface 2*a*. The first surface 14*a* may directly oppose the main surface 2*a* or may indirectly oppose the main surface 2*a*. The second surface 14*b* opposes the first surface 14*a*. The external electrode 4B is positioned between the element body 2 and a first part 174*a* of the connecting part 174. In the coil component 1, the through hole 41 is formed in the external electrode 4 as illustrated in FIG. 2. In the coil component 1B, no through hole is formed in the external electrode 4B.

The coil 7B includes the coil part 71 and the pair of connecting parts 173 and 174. The configuration of the coil part 71 is similar to the configuration described in the first embodiment. Each of the pair of connecting parts 173 and 174 is continuous with one of both ends of the coil part 71 that corresponds. The connecting part 173 is positioned closer to the end surface 2*d* than the middle of the main surface 2*a*. The connecting part 174 is positioned closer to the end surface 2*e* than the middle of the main surface 2*a*.

The connecting part 173 includes the first part 173*a* and a second part 173*b*. In the coil component 1, the first part 73*a* has a circular shape when viewed from the third direction D3. In the coil component 1B, the first part 173*a* has a rectangular shape with a rounded corner portion when viewed from the third direction D3. The shape of the first part 173*a* is not limited, and the first part 173*a* that is viewed from the third direction D3 may have an elliptical shape or a circular shape. The first part 173*a* is coupled to the second surface 13*b*. The coupling method is not limited, and the method may be similar to the method for coupling the first part 73*a* and the second surface 3*b* described in the first embodiment.

The second part 173*b* connects the first part 173*a* and one of both ends of the coil part 71 that corresponds. One end of the second part 173*b* is continuous with the first part 173*a*. The other end of the second part 173*b* is continuous with the end of the coil part 71. In the coil component 1, the entire second part 73*b* extends in the third direction D3. In the coil component 1B, the second part 173*b* extends in the third direction D3 and the first direction D1.

The second part 173*b* includes a bent part M1 and a straight part M2. The bent part M1 is positioned at the other end of the second part 173*b* and is continuous with the end of the coil part 71. The bent part M1 is bent from the third direction D3 to the first direction D1. The straight part M2 is the part of the second part 173*b* other than the bent part M1. The straight part M2 extends along the first direction D1. The part of the second part 173*b* that is continuous with the end of the coil part 71 is positioned outside the outer edge of the external electrode 3B when viewed from the third direction D3. In the present embodiment, the bent part M1 is positioned outside the outer edge of the external electrode 3B when viewed from the third direction D3.

The first part 173*a* and the second part 173*b* are formed with, for example, the following method. First, the part of the wire configuring the coil 7B that is exposed from the main surface 2*a* is bent and disposed along the first direction D1. Hereinafter, the part of the wire configuring the coil 7B that is exposed from the main surface 2*a* will be referred to as an exposed part. The bent part corresponds to the bent part M1. Apart of the exposed part is disposed to overlap the external electrode 3B in the third direction D3. Next, the part of the exposed part that overlaps the external electrode 3B is coupled to the second surface 13*b*. In the present embodiment, the part overlapping the external electrode 3B is melted and fused to the second surface 13*b*. The part of the exposed part that is coupled to the second surface 13*b* corresponds to the first part 173*a*, and the other part corresponds to the second part 173*b*.

Similarly to the connecting part 173, the connecting part 174 includes the first part 174*a* and a second part 174*b*. The first part 174*a* has a rectangular shape with a rounded corner portion when viewed from the third direction D3. The shape of the first part 174*a* is not limited, and the first part 174*a* that is viewed from the third direction D3 may have an elliptical shape or a circular shape. The first part 174*a* is coupled to the second surface 14*b*. The coupling method is not limited, and the method may be similar to the method for coupling the first part 74*a* and the second surface 4*b* described in the first embodiment.

The second part 174*b* connects the first part 174*a* and one of both ends of the coil part 71 that corresponds. One end of the second part 174*b* is continuous with the first part 174*a*. The other end of the second part 174*b* is continuous with the end of the coil part 71. The second part 174*b* includes a bent part M3 and a straight part M4. The bent part M3 is positioned at the other end of the second part 174*b* and is continuous with the end of the coil part 71. The bent part M3 is bent from the third direction D3 to the first direction D1. The straight part M4 is the part of the second part 174*b* other than the bent part M3. The straight part M4 extends along the first direction D1. The part of the second part 174*b* that is continuous with the end of the coil part 71 is positioned outside the outer edge of the external electrode 4B when viewed from the third direction D3. In the present embodiment, the bent part M3 is positioned outside the outer edge of the external electrode 4B when viewed from the third direction D3. The first part 174*a* and the second part 174*b* are formed with a method similar to how the first part 173*a* and the second part 173*b* are formed.

In the second embodiment, as in the first embodiment described above, the pair of external electrodes 3B and 4B include the first surfaces 13*a* and 14*a* opposing the main surface 2*a* of the element body 2 and the second surfaces 13*b* and 14*b* opposing the first surfaces 13*a* and 14*a*, respectively. The pair of connecting parts 173 and 174 include the first parts 173*a* and 174*a* coupled to the second surfaces 13*b* and 14*b* of the corresponding external electrodes 3B and 4B, respectively. The external electrodes 3B and 4B are positioned between the element body 2 and the first parts 173*a* and 174*a* of the connecting parts 173 and 174, and the external electrodes 3B and 4B are connected to the first parts 173*a* and 174*a* of the connecting parts 173 and 174. Accordingly, even in a case where a physical external force acts on the coil component 1B, the external electrodes 3B and 4B tend not to come off the connecting parts 173 and 174, and the electrical connection between the coil 7B and the external electrodes 3B and 4B is maintained. As a result, deterioration of the characteristics of the coil component 1B is suppressed.

Although the embodiment and modifications of the present invention have been described above, the present invention is not necessarily limited to the embodiment and modifications, and the embodiment can be variously changed without departing from the scope of the invention.

In the first embodiment, the plating layer 8 may cover at least the first part 73*a* and may not be formed over the entire area of the second surface 3*b*. The plating layer 9 may cover at least the first part 74*a* and may not be formed over the entire area of the second surface 4*b*.

In the second embodiment, the length of each of the external electrodes 3B and 4B in the first direction D1 may be equivalent to the length of the element body 2 in the first direction D1. In the coil component 1B according to the second embodiment, the external electrodes 3B and 4B may be similar in configuration to the external electrodes 3 and 4 according to the first embodiment, respectively. A through hole opening in the first surface 13*a* and the second surface 13*b* may be formed in the external electrode 3B, and the bent part M1 of the second part 173*b* may be inserted through the through hole. A through hole opening in the first surface 14*a* and the second surface 14*b* may be formed in the external electrode 4B, and the bent part M3 of the second part 174*b* may be inserted through the through hole.

In the second embodiment, the coil component 1B may further include a plating layer formed on the second surface 13*b* to cover the first part 173*a* and a plating layer formed on the second surface 14*b* to cover the first part 174*a*.

What is claimed is:

1. A coil component comprising:

an element body including a main surface;

a pair of external electrodes on the main surface; and a coil including a coil part in the element body and a pair of connecting parts exposed from the element body and each connected to a corresponding external electrode of the pair of external electrodes, wherein each of the pair of external electrodes includes a first surface opposing the main surface and a second surface opposing the first surface, each of the pair of connecting parts includes a first part coupled to the second surface of the corresponding external electrode and a second part continuous with the first part and an end of the coil part, each of the pair of external electrodes includes a through hole opening in the first surface and the second surface, each of the second parts is at least partially positioned in a corresponding one of the through holes, and each of the first parts includes a pair of portions that are opposite one another relative to the corresponding one of the through holes and extend away from one another when viewed perpendicular to the main surface.

2. The coil component according to claim 1, further comprising a plating layer formed on the second surface to cover the first part.

3. The coil component according to claim 1, wherein the element body includes a first element body part covering the coil part and a second element body part including the main surface, and the second element body part is positioned between the coil part and the pair of external electrodes.

4. The coil component according to claim 3, wherein a relative permittivity of the second element body part is lower than a relative permittivity of the first element body part.

* * * * *